United States Patent
Saito et al.

(10) Patent No.: US 11,562,016 B2
(45) Date of Patent: Jan. 24, 2023

(54) SYSTEMS AND METHODS FOR GENERATING SUPPLEMENTAL CONTENT FOR MEDIA CONTENT

(71) Applicant: Rovi Guides, Inc., San Jose, CA (US)

(72) Inventors: Sakura Saito, Tokyo (JP); Alan Waterman, Merced, CA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 16/453,841

(22) Filed: Jun. 26, 2019

(65) Prior Publication Data
US 2020/0409990 A1    Dec. 31, 2020

(51) Int. Cl.
| | |
|---|---|
| *G06F 16/583* | (2019.01) |
| *G06F 16/538* | (2019.01) |
| *G06F 16/903* | (2019.01) |
| *G06F 40/20* | (2020.01) |
| *G06F 3/0483* | (2013.01) |

(52) U.S. Cl.
CPC ........ *G06F 16/5846* (2019.01); *G06F 3/0483* (2013.01); *G06F 16/538* (2019.01); *G06F 16/90344* (2019.01); *G06F 40/20* (2020.01)

(58) Field of Classification Search
CPC ............... G06F 16/5846; G06F 16/538; G06F 16/90344; G06F 40/02
See application file for complete search history.

(56) References Cited

U.S. PATENT DOCUMENTS

| | | |
|---|---|---|
| 6,100,881 A | 8/2000 | Gibbons |
| 6,289,165 B1 | 9/2001 | Abecassis |
| 7,756,945 B1 | 7/2010 | Andreessen et al. |
| 8,578,416 B1 | 11/2013 | Radloff et al. |
| 8,937,620 B1 | 1/2015 | Teller |
| 9,106,812 B1 * | 8/2015 | Price .............. H04N 21/47205 |
| 9,671,940 B1 | 6/2017 | Malik et al. |

(Continued)

FOREIGN PATENT DOCUMENTS

| | | |
|---|---|---|
| CN | 106530227 A | 3/2017 |
| JP | 2005522108 A | 7/2005 |
| JP | 2008539479 A | 11/2008 |

OTHER PUBLICATIONS

U.S. Appl. No. 16/363,919, filed Mar. 25, 2019, Alan Waterman.

(Continued)

*Primary Examiner* — Stephen S Hong
*Assistant Examiner* — Nicholas Hasty
(74) *Attorney, Agent, or Firm* — Haley Guiliano LLP (57) ABSTRACT

Systems and methods are disclosed herein for generating supplemental content for media content. One disclosed technique herein generates for display a page of an electronic book. A noun, and a word contextually related to the noun, are identified from the displayed page of the electronic book. Content structures are searched for a content structure that includes a matching object having an object name matching the noun. The content structure includes objects, where each object has attribute table entries. Upon finding an identified attribute table entry of the matching object that matches the related word, a new content structure is generated. The new content structure includes the matching object and the identified attribute table entry. A content segment is generated for output (e.g., for display on the electronic book) based on the new content structure.

20 Claims, 10 Drawing Sheets

(56) References Cited

U.S. PATENT DOCUMENTS

| | | |
|---|---|---|
| 10,074,200 B1 | 9/2018 | Yeturu |
| 10,665,030 B1 | 5/2020 | Shekhar |
| 10,685,059 B2 | 6/2020 | Younghan et al. |
| 11,256,863 B2 | 2/2022 | Ahamed et al. |
| 2003/0105750 A1 | 6/2003 | Chaboche |
| 2004/0004665 A1 | 1/2004 | Kashiwa |
| 2006/0194181 A1 | 8/2006 | Rosenberg |
| 2007/0147654 A1 | 6/2007 | Clatworthy |
| 2007/0296723 A1 | 12/2007 | Williams |
| 2007/0300157 A1 | 12/2007 | Clausi et al. |
| 2009/0210395 A1 | 8/2009 | Sedam |
| 2009/0240727 A1 | 9/2009 | Sheehan |
| 2010/0050083 A1 | 2/2010 | Axen |
| 2010/0150526 A1 | 6/2010 | Rose et al. |
| 2011/0106656 A1 | 5/2011 | Schieffelin |
| 2011/0239119 A1 | 9/2011 | Phillips |
| 2012/0005616 A1* | 1/2012 | Walsh ............ G06F 16/34 715/776 |
| 2013/0080881 A1* | 3/2013 | Goodspeed ........ G06F 16/487 715/251 |
| 2014/0164593 A1* | 6/2014 | Murray ............ H04L 65/4015 709/224 |
| 2014/0207778 A1 | 7/2014 | Raichelgauz et al. |
| 2015/0011298 A1 | 1/2015 | Haid et al. |
| 2015/0016714 A1 | 1/2015 | Chui |
| 2015/0154192 A1 | 6/2015 | Lysne et al. |
| 2015/0269441 A1 | 9/2015 | Mj |
| 2016/0110612 A1 | 4/2016 | Sabripour et al. |
| 2017/0011280 A1 | 1/2017 | Soldevila et al. |
| 2017/0025152 A1 | 1/2017 | Jaime et al. |
| 2017/0097969 A1 | 4/2017 | Stein et al. |
| 2017/0098152 A1 | 4/2017 | Kerr et al. |
| 2017/0300748 A1 | 10/2017 | Austin |
| 2017/0315966 A1* | 11/2017 | Iyer ............... G06F 40/106 |
| 2018/0107638 A1* | 4/2018 | Ekambaram ........ G06F 3/04883 |
| 2018/0176661 A1 | 6/2018 | Varndell et al. |
| 2018/0300361 A1 | 10/2018 | Ben-Aharon et al. |
| 2018/0308523 A1 | 10/2018 | Silvestri et al. |
| 2018/0356967 A1 | 12/2018 | Rasheed |
| 2019/0155955 A1* | 5/2019 | Castaneda ........ G06F 16/3344 |
| 2019/0267041 A1 | 8/2019 | Ricciardi |
| 2020/0098283 A1* | 3/2020 | Vaculin ............ G06F 40/30 |
| 2020/0312368 A1 | 10/2020 | Waterman |
| 2020/0314508 A1 | 10/2020 | Waterman |
| 2020/0334246 A1 | 10/2020 | Chen et al. |
| 2021/0019368 A1 | 1/2021 | Ahamed et al. |
| 2021/0027427 A1 | 1/2021 | Waterman |
| 2021/0117409 A1 | 4/2021 | O'Connor et al. |
| 2021/0407044 A1 | 12/2021 | Waterman |
| 2022/0059134 A1 | 2/2022 | Waterman |
| 2022/0138415 A1 | 5/2022 | Ahamed et al. |

OTHER PUBLICATIONS

U.S. Appl. No. 16/451,823, filed Jun. 25, 2019, Alan Waterman.
U.S. Appl. No. 16/517,322, filed Jul. 19, 2019, Shakir Sharfraz Ashfaq Ahamed.
U.S. Appl. No. 16/522,332, filed Jul. 25, 2019, Alan Waterman.
Po et al., "Automatic 2D-to-3D video conversion technique based on depth-from-motion and color segmentation," IEEE10th International Conference, Oct. 24-28, 2010, 4 pages, https://ieeexplore.ieee.org/abstract/document/5655850.
PCT Search Report and Written Opinion in PCT/US2020/041121 dated Oct. 16, 2020.
Florescu, D. , et al., ""Storing and Querying XML Data using an RDMBS"", "Quarterly Bulletin of the Computer Society of the IEEE Technical Committee on Data Engineering", Sep. 1, 1999, pp. 27-34.
Luebke, David , ""A Developer's Survey of Polygonal Simplification Algorithms"", "IEEE Computer Graphics and Applications", Aug. 7, 2002, pp. 24-35.
Turk, Greg , ""Re-Tiling Polygonal Surfaces"", "Computer Graphics and Interactive Techniques", Jul. 1, 1992, pp. 55-64.
Tsaftaris et al., "Colorizing a Masterpiece" IEEE Signal Processing Magazine, May 2011 (7 pages).
PCT International Search Report and Written Opinion for International Application No. PCT/US2020/020075, dated Jun. 22, 2020 (14 pages).
U.S. Appl. No. 16/844,511, filed Apr. 9, 2020, Sahir Nasir.

* cited by examiner

SYSTEMS AND METHODS FOR GENERATING SUPPLEMENTAL CONTENT FOR MEDIA CONTENT

BACKGROUND

The present disclosure is directed to techniques for generating supplemental content in relation to media content, and more particularly to techniques for generating supplemental content for electronic books.

SUMMARY

Electronic devices commonly allow a user to access and read an electronic book. While the user is reading the electronic book, however, none or very little contextual information is provided to the user. In one approach, the electronic book may include hyperlinks for some of the words or phrases on the current page. The electronic book may also include pre-rendered static illustrations to accompany the text. Moreover, these electronic books lack a dynamic and automatic ability to generate and present supplemental content (e.g., audio, video, images) that relate to the text shown by the electronic book.

Accordingly, techniques are disclosed herein for generating and presenting real-time supplemental content for an electronic book. In some embodiments, the techniques generate and present supplemental content by altering contextual aspects of existing content structures to generate new content segments for output in electronic books.

One disclosed technique herein generates display of a page for an electronic book. A noun, and a related word contextually related to the noun, are identified from the displayed page of the electronic book. Using the identified noun, the system searches content structures for a content structure that includes a matching object having an object name matching the noun identified from the electronic book. The content structures include objects, where each object have attribute table entries. Upon finding an identified attribute table entry of the matching object that matches the related word, a new content structure is generated. The new content structure includes the matching object and the identified attribute table entry. A content segment is generated for output (e.g., for display on the electronic book) based on the new content structure. Exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

Various techniques are disclosed herein when the identified attribute table entries of the matching object do not match the related word. One disclosed technique determines an approximate attribute table entry which (approximately) matches the related word. A new content structure is generated including the matching object and the approximate attribute table entry. A content segment is generated for output (e.g., for display on the electronic book) based on the new content structure. Another disclosed technique provides for generating a new content structure comprising the matching object excluding the non-matching attribute table entry. A content segment is generated based on the new content structure which excludes the non-matching attribute table entry.

In some embodiments, the content structures further include virtual modelling data (e.g., vectoring data) for the objects and attribute table entries. The generated content segment includes determining matching virtual modelling data of the matching object including the identified attribute table entry. The content segment is rendered (e.g., a 3D animation) and generated for output based on the matching virtual modelling data. In other embodiments, the content segment may be outputted within the margins of the page of the electronic book. Exemplary content structures utilizing virtual modelling data are provided in co-pending application Ser. No. 16/451,823 entitled "SYSTEMS AND METHODS FOR CREATING CUSTOMIZED CONTENT," filed on Jun. 25, 2019, which is hereby expressly incorporated by reference herein in its entirety.

There are numerous techniques for determining an output duration of the generated content segment disclosed herein. One technique disclosed provides for determining first and second reading locations on the page (e.g., via optical sensor of a device) of the electronic book at first and second time stamps. The second time stamp occurs after the first time stamp, and the amount of text between the first and second reading locations is determined. An average reading speed value is then determined using the amount of text, and a difference between the first time stamp and the second time stamp. The content segment generated for output is for a duration based on the determined average reading speed value. The output may be extended upon determination that the current reading location on the page of the electronic book matches the location of the outputted content segment.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
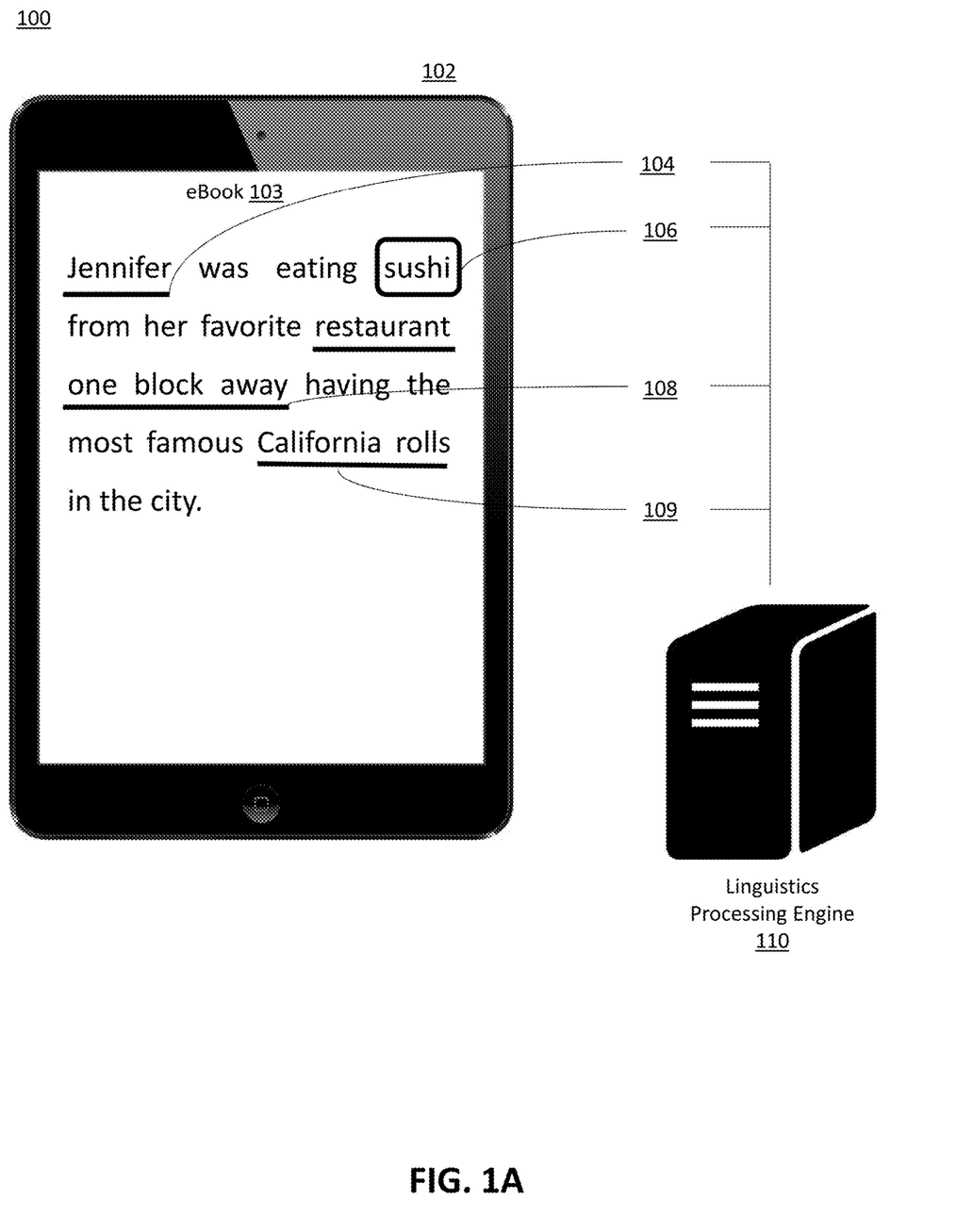
FIG. 1A shows an illustrative diagram for an electronic book displayed on a tablet device, in accordance with some embodiments of the disclosure.

FIG. 1A shows an illustrative diagram 100 for an electronic book displayed on a tablet device, in accordance with some embodiments of the disclosure. An electronic tablet device 102 includes a linguistics processing engine 110 (local and/or remote) that may generate display for an electronic book 103. In this example, the electronic book includes the following text: "Jennifer was eating sushi from her favorite restaurant one block away having the most famous California rolls in the city."

The linguistics processing engine may analyze the text from the electronic book. In particular, the analysis may include the classification of words from the text as nouns and contextual information related to respective nouns. The linguistics processing engine may identify a noun from the displayed page using various techniques. In some embodiments, the linguistics processing engine receives metadata of the electronic book from a device displaying the electronic book and/or an Internet service providing the electronic book as electronic content. The metadata may include all text within the electronic book and/or other text-related information about the electronic book. In other embodiments, the linguistics processing engine may implement Optical Character Recognition techniques to parse the words from the electronic book. Continuing from the above example, the linguistics processing engine may identify the word "sushi" 106 as the noun from the displayed page. Even though "Jennifer" 104 is a noun, the linguistics processing engine selected "sushi" as the noun for analysis. The identification of a particular noun from a plurality of nouns that are displayed may be based on a variety of techniques disclosed herein. In some embodiments, the noun identified may match a relevance score based on analysis of the entire text on the displayed page. In this embodiment, the entire text is analyzed for relevance based on user metadata. Nouns may be analyzed with one or more elements of user metadata based on relevance algorithms to generate a relevancy score. The highest score may be identified as the noun for identification from the displayed page. In other embodiments, relevance may be based on textual analysis of all words displayed on a page displayed by the electronic book using relevance algorithms known to a person of ordinary skill in the art. In yet other embodiments, relevance may be based on textual analysis of the words of at least a portion of the entire electronic book, using relevance algorithms known to a person of ordinary skill in the art.

The linguistics processing engine may identify a related word from the displayed page that is contextually related to the noun. Continuing from the above example, the words "Jennifer" 104, "restaurant one block away" 108, and "California rolls" 109 are identified as contextually related to the noun "sushi." The linguistics processing engine may identify related words from the displayed page as contextual based on various relevance algorithms. In some embodiments, all words within the displayed page are queried in a data structure with the identified noun. The data structure provides a relevancy score between the words relative to the identified noun. The words with the highest relevancy score may be identified as related words.

Figure 1B:
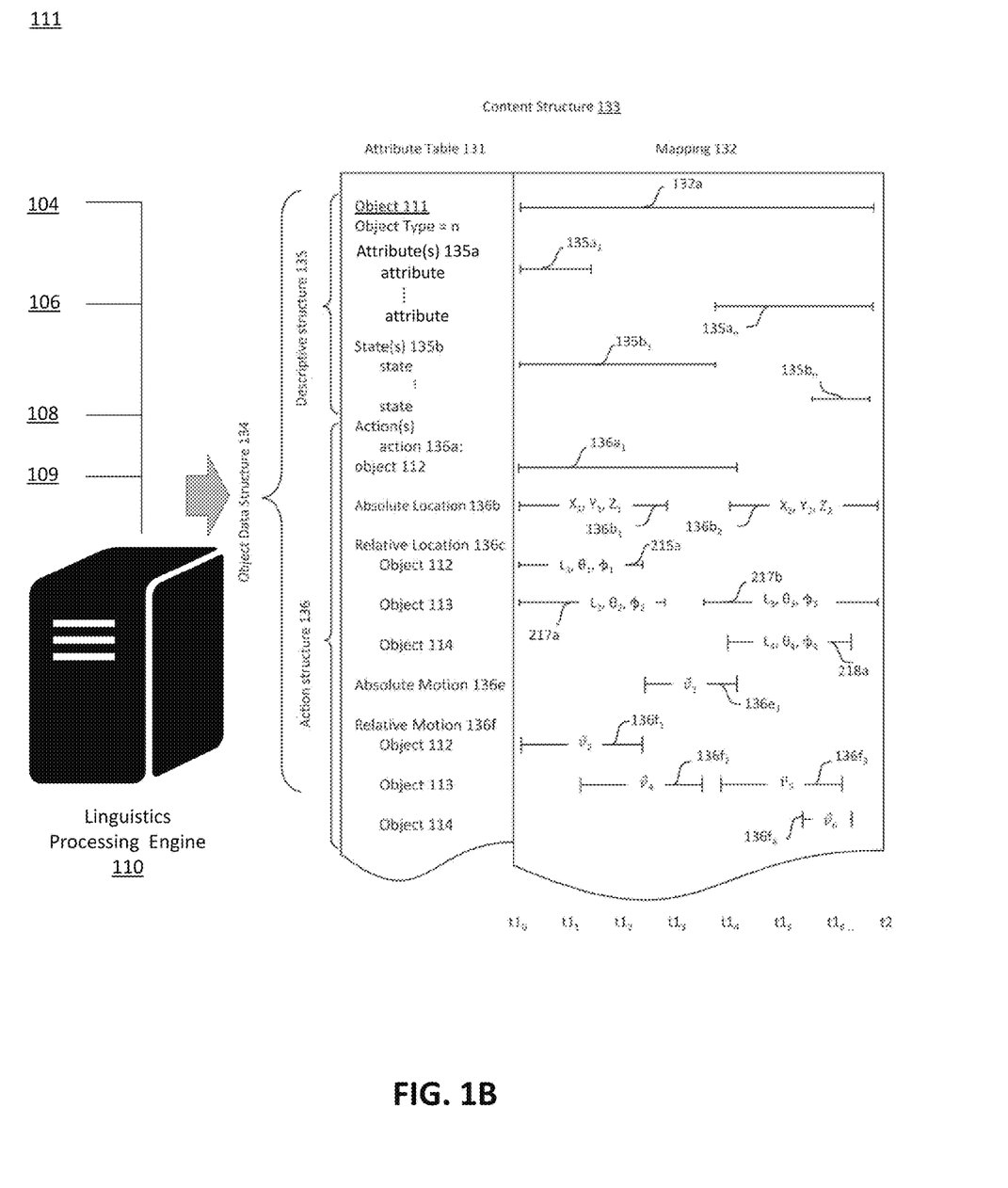
FIG. 1B shows an illustrative diagram of an exemplary content structure, in accordance with some embodiments of the disclosure.

FIG. 1B shows an illustrative diagram 111 of an exemplary content structure, in accordance with some embodiments of the disclosure. The linguistics processing engine 110 interfaces with a content structure 133, which includes an attribute table 131 and mapping 132. Specifically, attribute table 131 may include object data structures 134 including attributes relating to an object. The object data structure 134 includes attribute table entries such as a descriptive structure 135, an action structure 136, an audio structure, etc. Attribute table entries may be attributes, states, actions, or other types of substructure within the attribute table. The descriptive structure 135 lists attributes such as object name, object type (e.g., sushi, tacos, spaghetti, samosas, etc.), features 135$a$ (e.g., for sushi object type: California roll, Philadelphia roll, sashimi, maki, nigiri, etc.), states 135$b$ (e.g., in chopsticks, for presentation, partial eaten, pre-cut, etc.). The features 135$a$ and states 135$b$ may include different attributes based on the object type. The states 135$b$ may include an emotional state, a motion state (e.g., inanimate, picked up with fork, picked up with chopsticks, picked up with hands.

The action structure 136 is descriptive of actions that the object is performing on or to other objects. The action structure 136 lists action name/type 136$a$ (e.g., being prepared, being eaten, being eaten by Jon, being eaten by Jennifer, etc.), object(s) that the action involves, absolute location 136$b$ of the object with respect to the video frame, relative location 136$c$ relative to other object(s), absolute motion 136$e$, relative motion 136$f$, etc. The mapping 132$b$ corresponding to the action attribute 136$a$ may include a value indicative of a rate or a degree at which the action in taking place (e.g., eaten "slowly," "feverishly," "quickly," etc.).

Similarly, mapping 132 further shows action mapping 136$a_1$, absolute location mappings 136$b_{1-2}$, relative location mappings 215$a$, 217$a$, 217$b$ and 218$a$, absolute motion mapping 136$e_1$, relative motion mapping 136$f_{1-4}$, setting mappings, and setting feature mappings. In some embodiments, the mapping may be temporal, locational, or other value-based values corresponding to a specific objection, action, state, or attribute. In some embodiments, the mapping may be independent of the specific objection, action, state, or attribute. For example, the mapping may be of a general phenomenon independent of a corresponding object/action. Instead, any object within the proximity of that phenomenon may receive the respective mapping.

As previously mentioned, exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

Figure 1C:
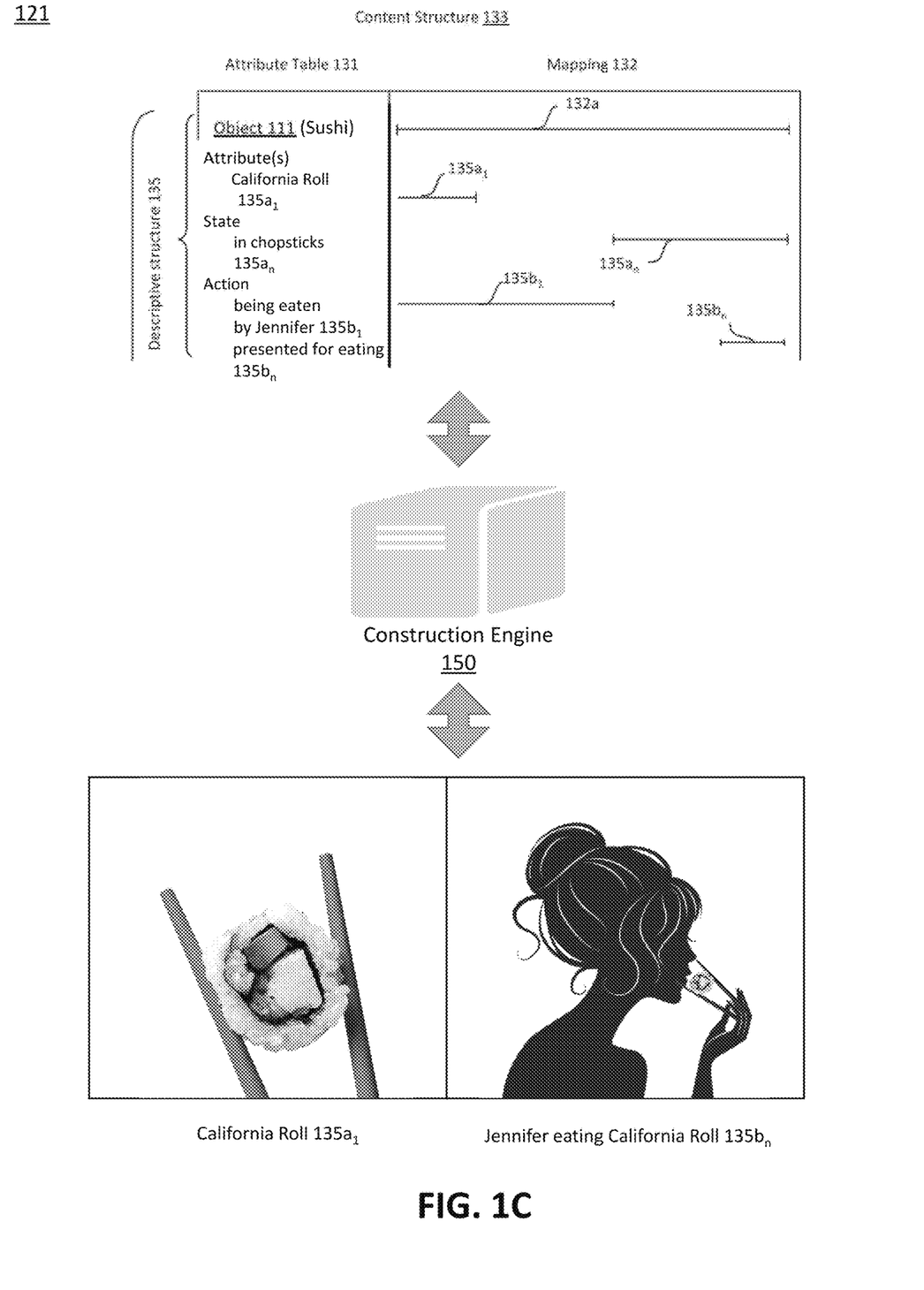
FIG. 1C shows an illustrative diagram for specific attribute table entry table selections from a content structure, in accordance with some embodiments of the disclosure.

FIG. 1C shows an illustrative diagram 121 for specific attribute table selections from a content structure, in accordance with some embodiments of the disclosure. A construction engine 150 may search a plurality of content structures for a content structure that comprises a matching object with an object name that matches the noun. Each of the content structures may include one or more objects. Each of the objects may include one or more attributes. Continuing from the above example, the content structure 133 includes an object 111 with the object name "sushi." The attribute table 131 includes attribute table entries, namely, an attribute that the sushi is "California roll" 135$a_1$, state "in chopsticks" 135$a_n$, and actions "being eaten by Jennifer" 135$b_1$ and "presented for eating" 135$b_n$. The identified related words include California roll, which matches the attribute table entry "California roll" 135$a_1$. Additionally, the identified related word "Jennifer" matches the attribute table entry "being eaten by Jennifer" $135b_1$.

The construction engine, in response to identifying an attribute table entry of the matching object that matches the related word, may generate a new content structure comprising the matching object. The matching object comprises the identified attribute table entry. Continuing from the above example, the matching object would be object 111 with matching attribute table entries "California roll" and "being eaten by Jennifer."

The construction engine, in response to identifying an attribute table entry of the matching object that does not match the related word, may determine an approximate attribute table entry of the matching object that matches the related word and generate for output a content segment based on the new content structure. Continuing from the above example, the matching object would be object 111 but may not have the entry "California roll," but instead has the entry "Philadelphia roll." The construction engine may determine that "Philadelphia roll" is an approximate attribute table entry of the matching object "sushi" that matches the related word "California roll." The approximate matching may be based on lexical similarity, contextual similarity of word definitions, similarity of aggregate or singular user selection history for both terms, or other similarity algorithms known to a person of ordinary skill in the art.

The construction engine, in response to identifying an attribute table entry of the matching object that does not match the related word, may generate a new content structure including the matching object but excluding the non-matching attribute table entry, and generate for output a content segment based on the new content structure. Continuing from the above example, the matching object (i.e., object 111) would exclude the attribute table entry of "presented for eating" $135b_n$.

Figure 1D:
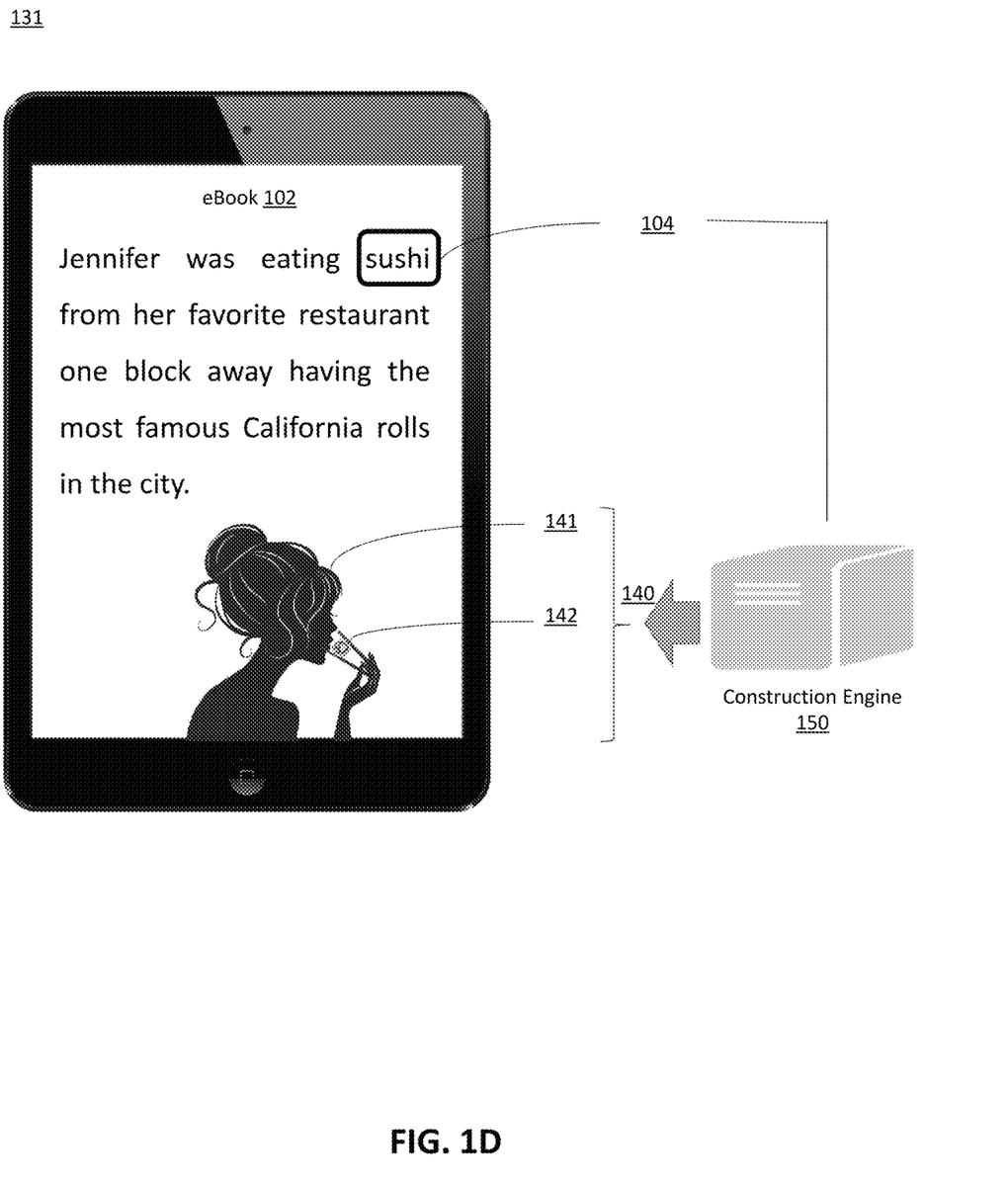
FIG. 1D shows an illustrative diagram for generating supplemental content for media content on the tablet device, in accordance with some embodiments of the disclosure.

FIG. 1D shows an illustrative diagram 131 for generating supplemental content for media content on the tablet device, in accordance with some embodiments of the disclosure. The construction engine may generate for output a content segment based on the new content structure. Continuing from the above example, object 111 with matching attribute table entries "California Roll" and "being eaten by Jennifer" has corresponding mappings from the content structure. For example, mappings for attribute table entry (action) "being eaten by Jennifer" may provide for temporal values (e.g., $135b_1$) for a specific animation for the action; namely that the animation of this content segment may be output for 30 seconds. As mentioned previously, further details relating to the creation and organization of content structures are provided in co-pending and commonly assigned U.S. nonprovisional application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

In some embodiments, the construction engine may generate for output a content segment based on the new content structure within the margins of the page of the electronic book. In other embodiments, the construction engine may generate for output a content segment based on the new content structure behind at least a portion of the displayed text of the page of the electronic book by configuring an amount of opacity to the content segment. In yet other embodiments, the content segment may include only an audio output to provide contextual ambiance to the text displayed on the page. For example, if the scene takes place in a café, the audio output may provide for ambient café atmospheric noise including temporal mapping values that last for the duration of the text taking place in the café.

One of the disclosed techniques provides for content structures including virtual modelling data for the objects and attribute table entries. The construction engine generates a content segment for output by determining matching virtual modelling data of the matching object. The matching object may include the identified attribute table entry. The construction engine renders (and generates for output) the content segment based on the matching virtual modelling data. The virtual modelling data may be any type of data that provides for information for creation of at least one of 2D animation, 3D animation, holographic representation, avatar-based modelling, or representations produced from artificial intelligence generation engines. Continuing from the above example, "being eaten by Jennifer" and the "California Roll" identified attribute table entries may have vectoring information corresponding to a positional 3D mapping in x-y-z coordinate space. As mentioned earlier, exemplary content structures utilizing virtual modelling data are provided in Ser. No. 16/451,823 entitled "SYSTEMS AND METHODS FOR CREATING CUSTOMIZED CONTENT," filed on Jun. 25, 2019, which is hereby expressly incorporated by reference herein in its entirety, which is hereby expressly incorporated by reference herein in its entirety. Based on this corresponding vectoring information, a 3D animation of Jennifer eating sushi is generated as a content segment for output for the electronic book.

There are numerous techniques for determining an output duration of the generated content segment disclosed herein. One technique disclosed provides for the linguistics processing engine determining first and second reading locations on the page (e.g., via optical sensor of a device) of the electronic book at first and second time stamps. The linguistics processing engine then determines the amount of text between the first reading location and the second reading location. An average reading speed value is determined by the linguistics processing engine based on the amount of text, and a difference between the first time stamp and the second time stamp. The output of the content segment is based on an output duration, where the length of the output duration is based on the determined average reading speed value. Continuing from the above example, the tablet device that is displaying the electronic book has an embedded front-mounted camera which can detect the viewing angle of the user. Based on the viewing angle measured by the embedded front-mounted camera, the linguistics processing engine determines a first and second viewing angle as the user reads consecutive lines of the electronic book. An average reading speed value is calculated as 200 words per minute. Based on this value, the content segment of Jennifer eating the California Roll will be output for approximately 30 seconds (100 words, equivalent to 30 seconds), as the contextual information about Jennifer eating the California Roll spans approximately three lines comprising 100 words. In some embodiments, the content segments are output in real time as the optical sensor (or similar) detects the specific text that is being viewed by the user.

In some embodiments, in response to a determination that the current reading location on the page of the electronic book matches the location of the outputted content segment, the output duration is extended. For example, if the system determines via the optical sensor that the user is viewing the 3D animation of Jennifer eating the California Roll, this animation will be extended indefinitely as long as the user continues to view the animation.

In some embodiments, the linguistics processing engine may determine a viewing angle of a user on the displayed page of the electronic book via an optical sensor. Based on the optical sensor, the linguistics processing engine may determine a particular line of text on the displayed page of the electronic book. For example, the optical sensor may be embedded in a device generating for display the page of the electronic book (e.g., tablet device, television, computer, smartphone), or a wearable device (e.g., smart-glasses, smart jewelry, etc.)

Figure 2:
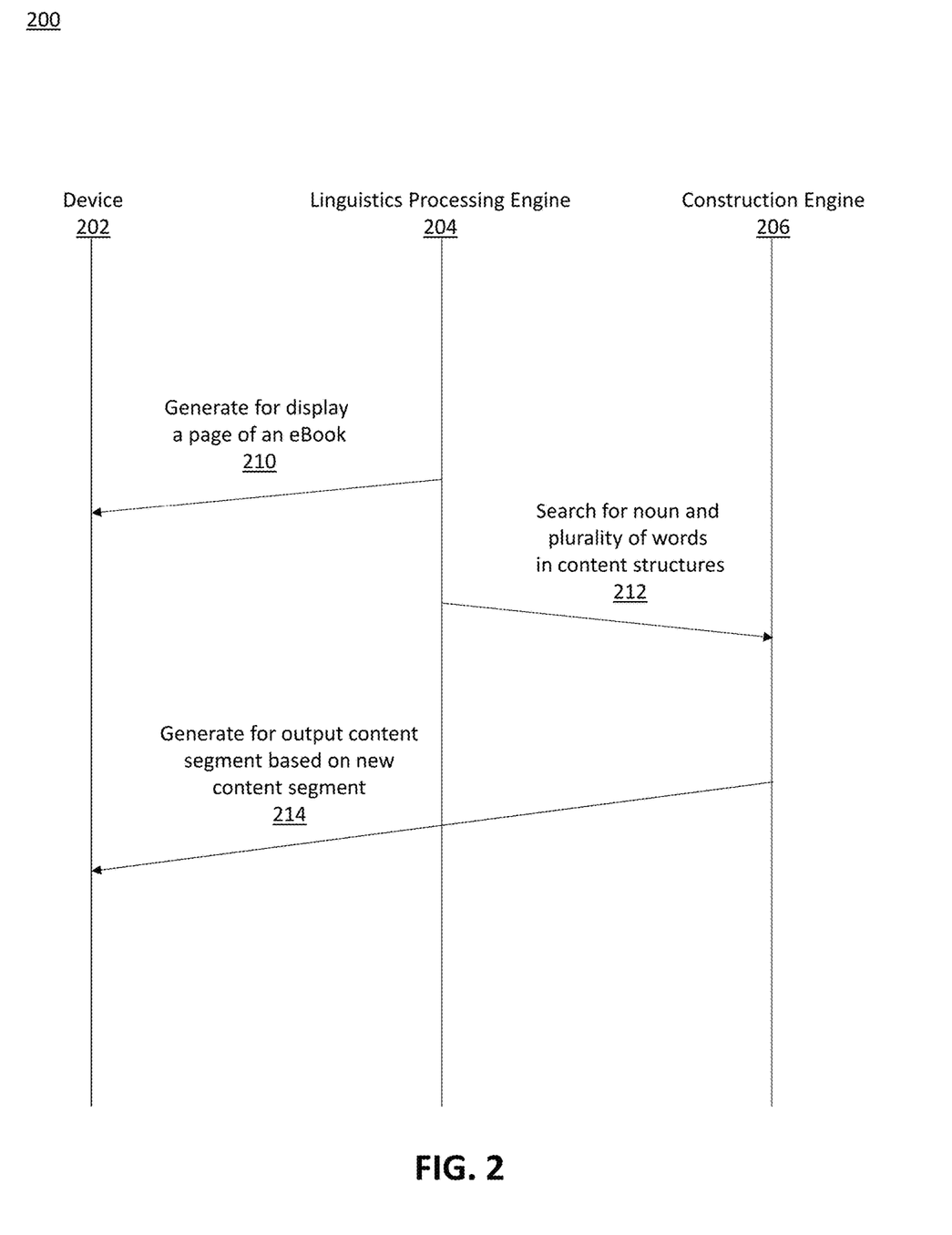
FIG. 2 shows an illustrative data flow diagram including a device, a linguistics processing engine, and a construction engine, in accordance with some embodiments of the disclosure.

FIG. 2 shows an illustrative data flow diagram 200 including a device, a linguistics processing engine, and a construction engine, in accordance with some embodiments of the disclosure. The linguistics processing engine 204 generates display of a page 210 from an electronic book for a device 202. The linguistics processing engine 204 identifies a noun from the displayed page and then identifies a related word from the displayed page that is contextually related to the noun. The linguistics processing engine 204 transmits information to the construction engine 206 to search 212 a plurality of content structures for a content structure that includes a matching object with an object name that matches the noun. The construction engine 206 identifies an attribute table entry of the matching object that matches the related word. The construction engine 206 generates a new content structure including the matching object and the identified attribute table entry. The construction engine 206 generates 214 a content segment based on the new content structure and transmits the content segment to the device 202.

Figure 3:
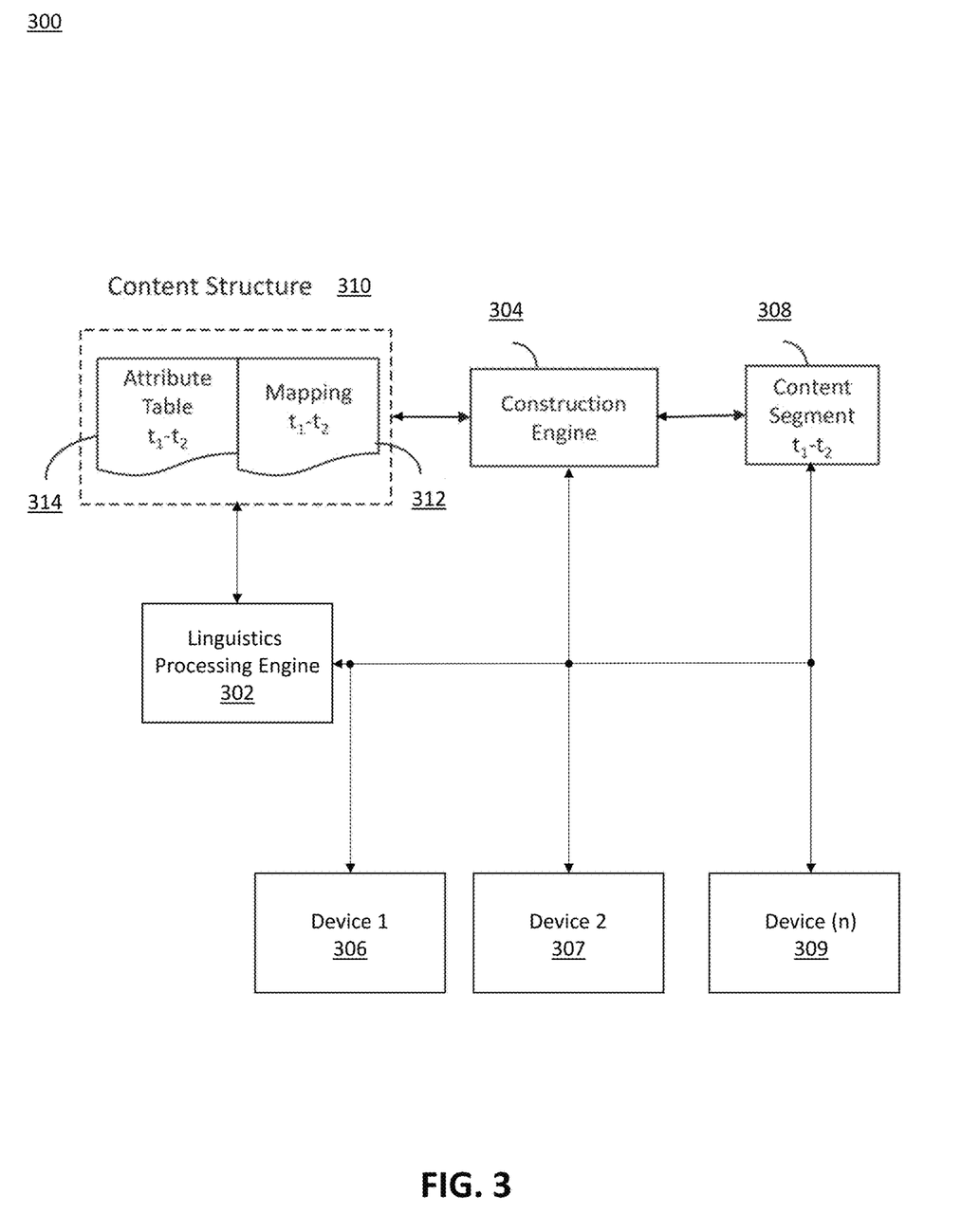
FIG. 3 shows an illustrative system diagram of the linguistics processing engine, the content structure, the construction engine, the content segment, and devices, in accordance with some embodiments of the disclosure.
Figure 4A:
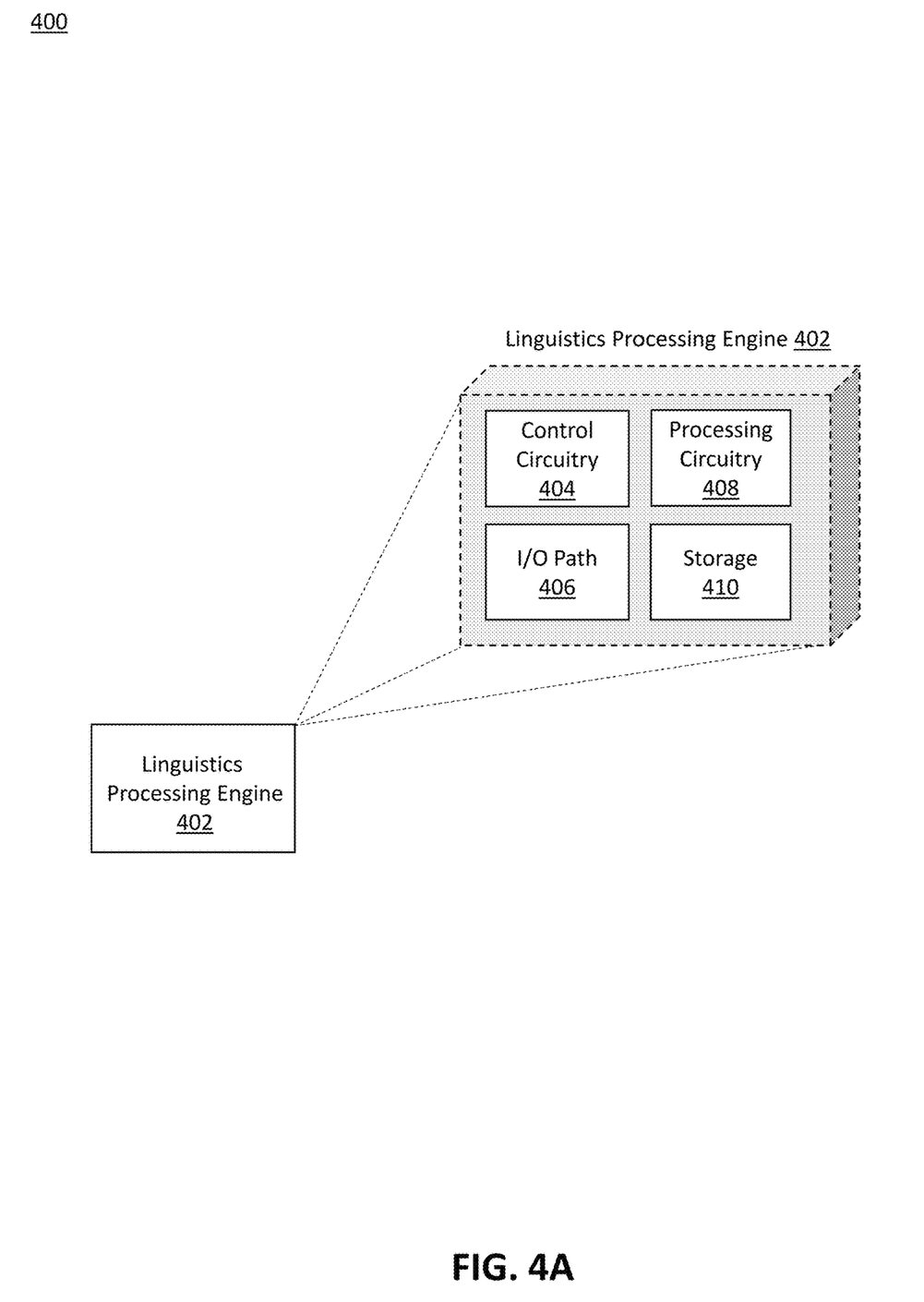
FIG. 4A shows an illustrative block diagram of the linguistics processing engine, in accordance with some embodiments of the disclosure.
Figure 4B:
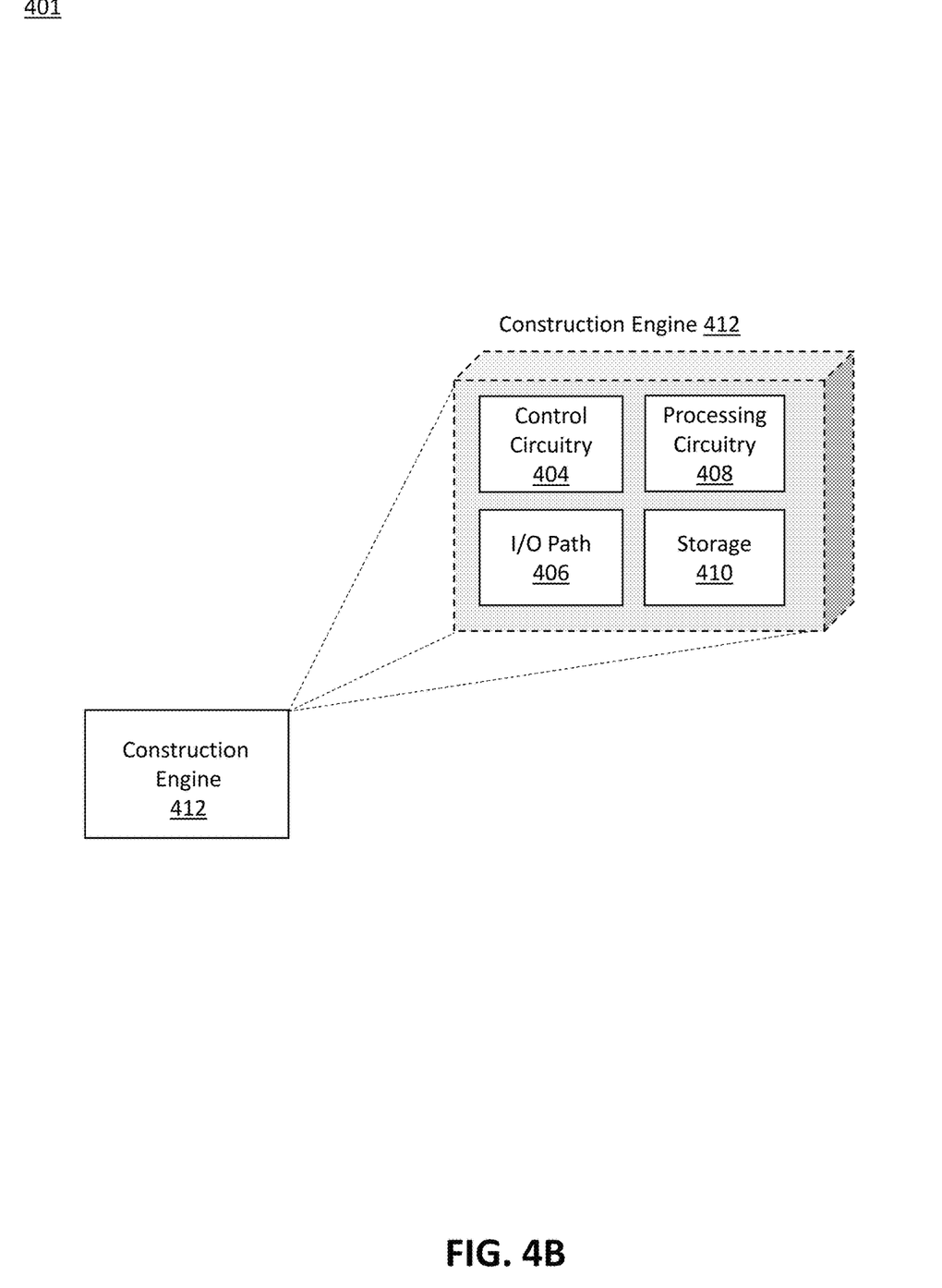
FIG. 4B shows an illustrative block diagram of the construction engine, in accordance with some embodiments of the disclosure.

FIG. 3 shows an illustrative system diagram 300 of the linguistics processing engine, the content structure, the construction engine, the content segment, and devices, in accordance with some embodiments of the disclosure. The linguistics processing engine 302 may be of any hardware that provides for processing and transmit/receive functionality. The linguistics processing engine may be communicatively coupled to multiple electronic devices (e.g., device 1 (306), device 2 (307), and device n (309)). The linguistics processing engine may be communicatively coupled to a content structure 310, a construction engine 304, and content segment 308. As illustrated within FIG. 3, a further detailed disclosure on the linguistics processing engine can be seen in FIG. 4A showing an illustrative block diagram of the linguistics processing engine, in accordance with some embodiments of the disclosure. Additionally, as illustrated within FIG. 3, a further detailed disclosure on the construction engine can be seen in FIG. 4B showing an illustrative block diagram of the construction engine, in accordance with some embodiments of the disclosure.

In some embodiments, the linguistics processing engine may be implemented remote from the devices 306-309 such as from a cloud server configuration. The linguistics processing engine may be any device for retrieving information from the devices 306-309 and identifying and/or parsing textual and other information from media content played on devices 306-309. The linguistics processing engine may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., linguistics processing engine, data structure, ISP, and electronic devices) may be any combination of shared or disparate hardware pieces that are communicatively coupled.

In some embodiments, the construction engine may be implemented remote from the electronic devices 306-309 such as a cloud server configuration. The construction engine may be any device for accessing the content structure and generating content segments as described above. The construction may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., linguistics processing engine, data structure, ISP, and electronic devices) may be any combination of shared or disparate hardware pieces that are communicatively coupled.

In some embodiments, the linguistics processing engine, construction engine, and a device from devices 306-309 may be implemented within a single local device. In other embodiments, the linguistics processing engine and construction engine may be implemented within a single local device.

The electronic devices (e.g., device 1 (306), device 2 (307), device n (309)) may be any device that has properties to transmit/receive network data as well as an interface to play back media content (e.g., touchscreen, speakers, keyboard, voice command input and confirmation, or any other similar interfaces). The devices 306-309 may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same.

The content structure 310 may be any database, server, or computing device that contains memory for receiving and transmitting data related to the attribute table 314 and mapping 312. Example data that may be stored in the content structure, as described earlier, can be seen in FIG. 1B. The content structure may be cloud based, integrated into the linguistics processing engine, construction engine, and/or integrated into one of the devices 307-309. In some embodiments, the content structure is communicatively coupled to both the linguistics processing engine 302 and the construction engine 312.

The content segment 308 may be any data or information that is generated by the construction server 304. The content segment may be transmitted by the construction server 304 to any of the devices 306-309. The content segment may be communicatively coupled to the devices 306-309, the construction engine 304, and the linguistics processing engine 302.

FIG. 4A shows an illustrative block diagram 400 of the linguistics processing engine, in accordance with some embodiments of the disclosure. In some embodiments, the linguistics processing engine may be communicatively connected to a user interface. In some embodiments, the linguistics processing engine may include processing circuitry, control circuitry, and storage (e.g., RAM, ROM, hard disk, removable disk, etc.). The linguistics processing engine may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a linguistics processing engine stored in memory (e.g., storage 410).

Memory may be an electronic storage device provided as storage 410, which is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The linguistics processing engine 402 may be coupled to a communications network. The communication network may be one or more networks including the Internet, a mobile phone network, mobile voice or data network (e.g., a 5G, 4G or LTE network), mesh network, peer-to-peer network, cable network, or other types of communications network or combinations of communications networks. The linguistics processing engine may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

FIG. 4B shows an illustrative block diagram 401 of the construction engine, in accordance with some embodiments of the disclosure. The construction engine may perform each of the operations individually or collaboratively. In some embodiments, the construction engine may be communicatively connected to a user interface. In some embodiments, the construction engine may include processing circuitry, control circuitry, and storage (e.g., RAM, ROM, hard disk, removable disk, etc.). The construction engine may include an input/output path 406. The construction engine may be coupled to a communications network.

Figure 5:
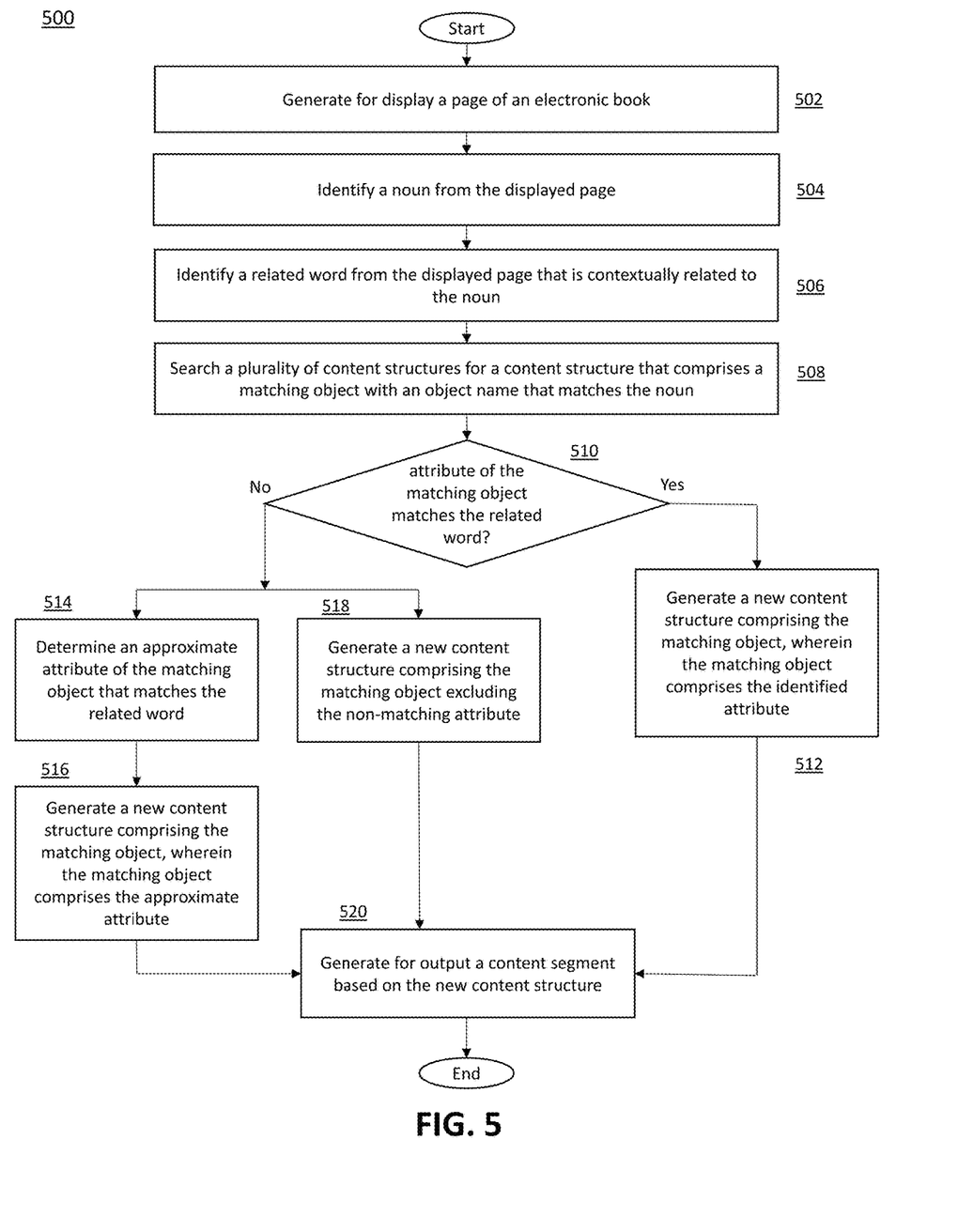
FIG. 5 is an illustrative flowchart of a process for generating supplemental content for media content, in accordance with some embodiments of the disclosure.

FIG. 5 is an illustrative flowchart of a process 500 for generating supplemental content for media content, in accordance with some embodiments of the disclosure. Process 500, and any of the following processes, may be executed by control circuitry 404 (e.g., in a manner instructed to control circuitry 404 by the linguistics processing engine 402 and/or construction engine 412). Control circuitry 404 may be part of a network optimizer, or of a remote server separated from the network optimizer by way of a communication network, or distributed over a combination of both.

At 502, the linguistics processing engine 302, by control circuitry 404, generates for display a page of an electronic book. In some embodiments, the linguistics processing engine, subsequent to generating for display a page of an electronic book, transmits this information via the I/O path 406 to a device from devices 306-309.

At 504, the linguistics processing engine 302, by control circuitry 404, identifies a noun from the displayed page. In some embodiments, the identification of the noun from the displayed page from a device 306-309 is performed, at least in part, by processing circuitry 408.

At 506, the linguistics processing engine 302, by control circuitry 404, identifies a related word from the displayed page that is contextually related to the noun. In some embodiments, the identification of the related word from the displayed page of a device 306-309 that is contextually related to the noun is performed, at least in part, by processing circuitry 408.

At 508, the construction engine 304, by control circuitry 404, searches a plurality of content structures for a content structure that includes a matching object with an object name that matches the noun. In some embodiments, the searching of a plurality of content structures is performed by the construction engine 304 transmitting requests via the I/O path 406 to the content structure 310. In some embodiments, the matching performed by the construction engine 304 is performed, at least in part, by processing circuitry 408.

At 510, the construction engine 304, by control circuitry 404, determines whether an attribute table entry of the matching object has been identified that matches the related word. In one embodiment, if, at 510, control circuitry determines "No," the attribute table entry of the matching object has not been identified that matches the related word, the process advances to 514. At 514, the construction engine 304, by control circuitry 404, determines an approximate attribute of the matching object that matches the related word.

At 516, the construction engine 304, by control circuitry 404, generates a new content structure comprising the matching object. The matching object comprises the approximate attribute.

In another embodiment, if, at 510, control circuitry determines "No," the attribute table entry of the matching object has not been identified that matches the related word, the process advances to 518. At 518, the construction engine 304, by control circuitry 404, generates a new content structure comprising the matching object excluding the non-matching attribute.

If, at 510, control circuitry determines "Yes," the attribute table entry of the matching object has been identified that matches the related word, the process advances to 512. At 512, the construction engine 304, by control circuitry 404, generates a new content structure comprising the matching object. The matching object comprises the identified attribute.

At 520, the construction engine 304, by control circuitry 404, generates for output a content segment based on the new content structure. In some embodiments, the construction engine 304, by control circuitry 404, may transmit the content segment via the I/O path 406 to a device 306-309.

Figure 6:
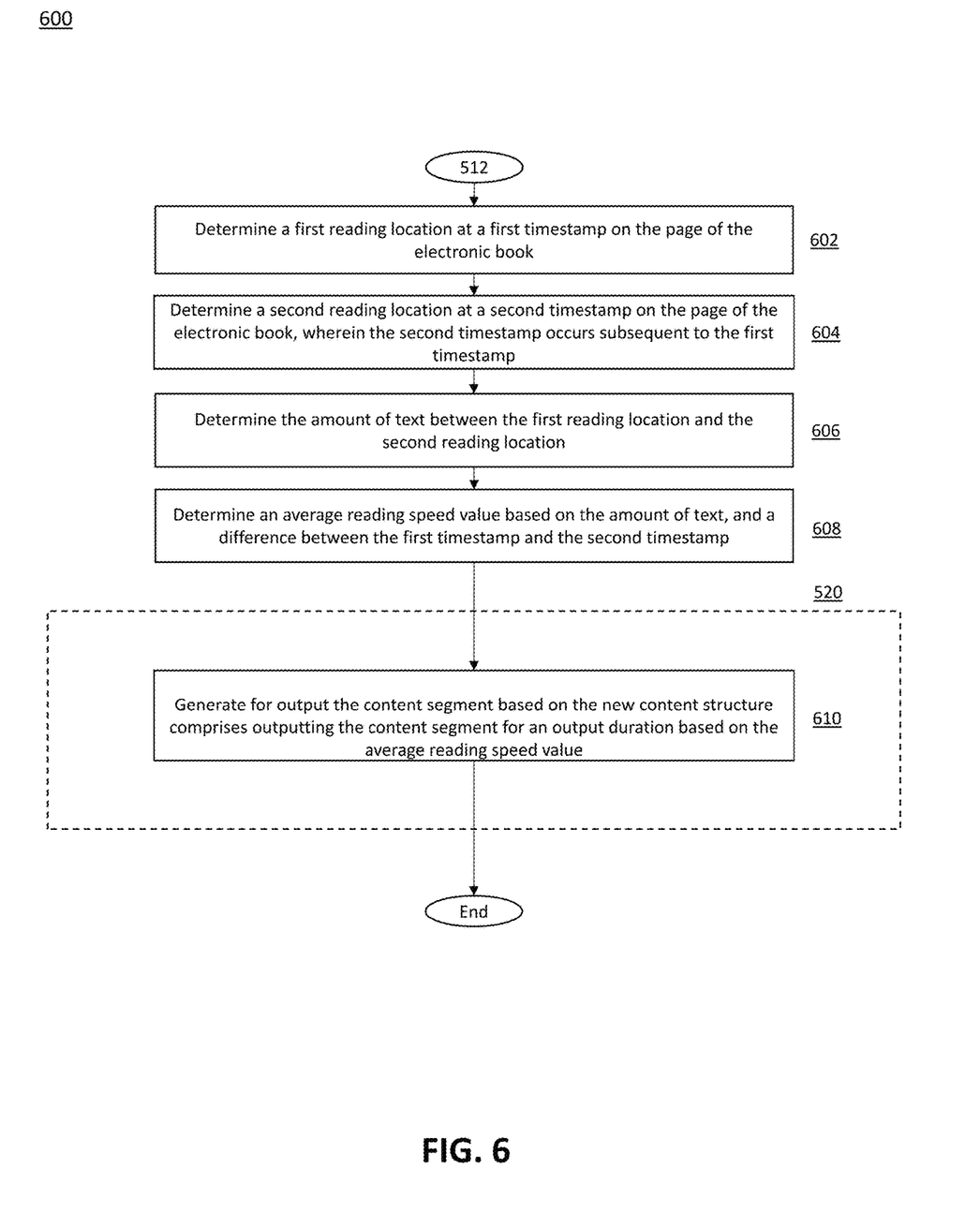
FIG. 6 is an illustrative flowchart of a process for outputting a content segment for an output duration based on an average reading speed value, in accordance with some embodiments of the disclosure.

FIG. 6 is an illustrative flowchart of a process 600 for outputting a content segment for an output duration based on an average reading speed value, in accordance with some embodiments of the disclosure. At 602, the linguistics processing engine 302, by control circuitry 404, determines a first reading location at a first time stamp on the page of the electronic book. In some embodiments, the linguistics processing engine 302 receives information from the devices 306-309 via the I/O path 406 (e.g., an optical sensor on the devices providing viewing angle information to the linguistics processing engine).

At 604, the linguistics processing engine 302, by control circuitry 404, determines a second reading location at a second time stamp on the page of the electronic book. The second time stamp occurs subsequent to the first time stamp. In some embodiments, the linguistics processing engine 302 receives information from the devices 306-309 via the I/O path 406 (e.g., an optical sensor on the devices providing viewing angle information to the linguistic processing engine).

At 606, the linguistics processing engine 302, by control circuitry 404, determines the amount of text between the first reading location and the second reading location. In some embodiments, the determination of the amount of text between the first reading location and the second reading location by the linguistics processing engine 302 is performed, at least in part, by processing circuitry 408.

At 608, the linguistics processing engine 302, by control circuitry 404, determines an average reading speed value based on the amount of text, and a difference between the first time stamp and the second time stamp. In some embodiments, the determination of the average reading speed value by the linguistics processing engine 302 is performed, at least in part, by processing circuitry 408.

At 610, the construction engine 304, by control circuitry 404, outputs the content segment for an output duration based on the average reading speed value. In some embodiments, the construction engine 304, by control circuitry 404, may transmit the content segment via the I/O path 406 to a device 306-309.

It is contemplated that the steps or descriptions of FIGS. 5-6 may be used with any other embodiment of this disclosure. In addition, the steps and descriptions described in relation to FIGS. 5-6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3, 4A, and 4B could be used to perform one or more of the steps in FIGS. 5-6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating supplemental content for media content, the method comprising:
   generating for display a particular page of an electronic book;
   identifying, with a linguistics processing engine and without receiving user interface input, a noun from the displayed particular page;
   identifying a related word from the displayed page that is contextually related to the noun and identifies an action related to the noun;
   searching a plurality of content structures for a content structure that comprises a matching object with an object name that matches the noun, wherein each of the plurality of content structures comprises:
      an attribute table including one or more object data structures, each object data structure comprising one or more attribute table entries including a feature, and a temporal mapping indicating a time period to which the feature applies; and
   in response to identifying an attribute table entry of the matching object that matches the related word:
      generating a new content structure comprising the matching object, wherein the matching object comprises the identified attribute table entry; and
      generating for output a content segment based on the new content structure, wherein the content segment is a video displayed on the particular page of a display of the electronic book as the particular page displaying the noun and the related word, wherein the video depicts the identified action performed in relation to the noun.

2. The method of claim 1, wherein:
   in response to identifying an attribute table entry of the matching object that does not match the related word, determining an approximate attribute table entry of the matching object that matches the related word;
   generating a new content structure comprising the matching object, wherein the matching object comprises the approximate attribute table entry; and generating for output a content segment based on the new content structure.

3. The method of claim 1, wherein:
in response to identifying an attribute table entry of the matching object that does not match the related word:
generating a new content structure comprising the matching object excluding the non-matching attribute table entry; and
generating for output a content segment based on the new content structure.

4. The method of claim 1, wherein:
the plurality of content structures further comprises virtual modelling data for the one or more objects and one or more attribute table entries of each of the one or more objects, wherein the virtual modelling data includes at least one of 2D animation, 3D animation, holographic representation, avatar-based modelling, or representations produced from artificial intelligence generation engines; and
generating for output a content segment based on the new content structure comprises:
determining matching virtual modelling data of the matching object comprising the identified attribute table entry;
rendering the content segment based on the matching virtual modelling data; and
generating for output the rendered content segment.

5. The method of claim 1, wherein the attribute table is mapped against a plurality of time stamps, and wherein:
the method further comprises:
determining a first reading location at a first time stamp of the plurality of time stamps on the page of the electronic book;
determining a second reading location at a second time stamp of the plurality of time stamps on the page of the electronic book, wherein the second time stamp occurs subsequent to the first time stamp;
determining the amount of text between the first reading location and the second reading location; and
determining an average reading speed value based on the amount of text, and a difference between the first time stamp and the second time stamp; and
generating for output the content segment based on the new content structure comprises outputting the content segment for an output duration based on the average reading speed value.

6. The method of claim 5, wherein determining at least one of the first reading location or second reading location comprises:
determining, using an optical sensor, a viewing angle of a user on the displayed page of the electronic book; and
determining, based on the viewing angle of the user on the displayed page of the electronic book, a particular line of text on the displayed page of the electronic book.

7. The method of claim 6, wherein the optical sensor may be embedded in at least one of a device generating for display the page of the electronic book, or a wearable device.

8. The method of claim 5, wherein outputting the content segment for a duration based on the average reading speed value further comprises:
determining whether a current reading location on the page of the electronic book matches a location of the outputted content segment; and
in response to the determination that the current reading location on the page of the electronic book matches the location of the outputted content segment, extending the output duration.

9. The method of claim 1, wherein generating for output a content segment based on the new content structure comprises outputting the content segment within the margins of the page of the electronic book.

10. A system for generating supplemental content for media content, comprising:
control circuitry configured to:
generate for display a particular page of an electronic book;
identify, with a linguistics processing engine and without receiving user interface input, a noun from the displayed particular page;
identify a related word from the displayed page that is contextually related to the noun and identifies an action related to the noun;
search a plurality of content structures for a content structure that comprises a matching object with an object name that matches the noun, wherein each of the plurality of content structures comprises:
an attribute table including one or more object data structures, each object data structure comprising one or more attribute table entries including a feature, and a temporal mapping indicating a time period to which the feature applies; and
in response to identifying an attribute table entry of the matching object that matches the related word:
generate a new content structure comprising the matching object, wherein the matching object comprises the identified attribute table entry; and
generate for output a content segment based on the new content structure, wherein the content segment is a video displayed on the particular page of a display of the electronic book as the particular page displaying the noun and the related word, wherein the video depicts the identified action performed in relation to the noun.

11. The system of claim 10, wherein:
the control circuitry is configured to, in response to identifying an attribute table entry of the matching object that does not match the related word, determine an approximate attribute table entry of the matching object that matches the related word;
the control circuitry is further configured to:
generate a new content structure comprising the matching object, wherein the matching object comprises the approximate attribute table entry; and
generate for output a content segment based on the new content structure.

12. The system of claim 10, wherein:
the control circuitry is configured to, in response to identifying an attribute table entry of the matching object that does not match the related word:
generate a new content structure comprising the matching object excluding the non-matching attribute table entry; and
generate for output a content segment based on the new content structure.

13. The system of claim 10, wherein:
the plurality of content structures further comprises virtual modelling data for the one or more objects and one or more attribute table entries of each of the one or more objects, wherein the virtual modelling data includes at least one of 2D animation, 3D animation, holographic representation, avatar-based modelling, or representations produced from artificial intelligence generation engines; and the control circuitry is configured, when generating for output a content segment based on the new content structure, to:
  determine matching virtual modelling data of the matching object comprising the identified attribute table entry;
  render the content segment based on the matching virtual modelling data; and
  generate for output the rendered content segment.

14. The system of claim 10, wherein the attribute table is mapped against time stamps, and wherein:
  the control circuitry is further configured to:
    determine a first reading location at a first time stamp of the plurality of time stamps on the page of the electronic book;
    determine a second reading location at a second time stamp of the plurality of time stamps on the page of the electronic book, wherein the second time stamp occurs subsequent to the first time stamp;
    determine the amount of text between the first reading location and the second reading location; and
    determine an average reading speed value based on the amount of text, and a difference between the first time stamp and the second time stamp; and
  the control circuitry is configured, when generating for output the content segment based on the new content structure, to output the content segment for an output duration based on the average reading speed value.

15. The system of claim 14, wherein the control circuitry is configured, when determining at least one of the first reading location or second reading location, to:
  determine, using an optical sensor, a viewing angle of a user on the displayed page of the electronic book; and
  determine, based on the viewing angle of the user on the displayed page of the electronic book, a particular line of text on the displayed page of the electronic book.

16. The system of claim 15, wherein the optical sensor may be embedded in at least one of a device generating for display the page of the electronic book, or a wearable device.

17. The system of claim 14, wherein the control circuitry is further configured, when outputting the content segment for a duration based on the average reading speed value, to:
  determine whether a current reading location on the page of the electronic book matches a location of the outputted content segment; and
  in response to the determination that the current reading location on the page of the electronic book matches the location of the outputted content segment, extend the output duration.

18. The system of claim 10, wherein generating for output a content segment based on the new content structure comprises outputting the content segment within the margins of the page of the electronic book.

19. The method of claim 1, wherein the identifying the noun comprises one or more of:
  receiving metadata of the electronic book from an internet service providing the electronic book as electronic content;
  performing optical character recognition techniques to parse the words from the electronic book;
  matching the noun identified with a relevance score based on analysis of an entire text on the displayed page; and
  matching the noun identified with a relevance score based on analysis of at least a portion of an entirety of the electronic book.

20. The system of claim 10, wherein the identifying the noun comprises one or more of:
  receiving metadata of the electronic book from an internet service providing the electronic book as electronic content;
  performing optical character recognition techniques to parse the words from the electronic book;
  matching the noun identified with a relevance score based on analysis of an entire text on the displayed page; and
  matching the noun identified with a relevance score based on analysis of at least a portion of an entirety of the electronic book.

* * * * *